United States Patent
Rattenbury et al.

[15] 3,697,627
[45] Oct. 10, 1972

[54] POLYMERCAPTO POLYPHOSPHONITES

[72] Inventors: Kenneth Rattenbury; Millard S. Larrison, both of Morgantown, W. Va.

[73] Assignee: Weston Chemical Corporation, New York, N.Y. ; by said Rattenbury

[22] Filed: July 22, 1969

[21] Appl. No.: 879,143

[52] U.S. Cl. ........... 260/928, 260/45.7, 260/290 R, 260/329 P, 260/340.6, 260/929, 260/930, 260/973
[51] Int. Cl. ............ C07f 9/08, C07f 9/16, C07f 9/32
[58] Field of Search ............... 260/928, 929, 930, 290 R, 329 P, 260/340.6

[56] References Cited

UNITED STATES PATENTS

| | | | |
|---|---|---|---|
| 3,097,997 | 7/1963 | Szabo et al. | 260/929 X |
| 3,100,735 | 8/1963 | Szabo et al. | 260/929 X |
| 3,248,412 | 4/1956 | Schrader | 260/928 X |
| 2,736,737 | 2/1956 | Morris | 260/928 |
| 3,489,803 | 1/1970 | Maier | 260/928 X |

*Primary Examiner*—Lewis Gotts
*Assistant Examiner*—Richard L. Raymond
*Attorney*—Cushman, Darby & Cushman

[57] ABSTRACT

Compounds are prepared of the formula

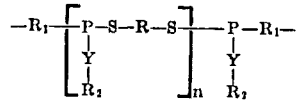

where $n$ is an integer of 1 to 10, Y is oxygen or sulfur, $R_1$ and $R_2$ are alkyl, haloalkyl, aryl, haloaryl, alkenyl, aralkyl, haloalkenyl or cycloalkyl and R is a divalent aromatic, aliphatic or cycloaliphatic group.

The compounds are useful as stabilizers.

9 Claims, No Drawings

POLYMERCAPTO POLYPHOSPHONITES

The present invention relates to novel mercapto phosphonites.

The compounds have the general formula

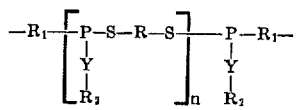

where $n$ is an integer of at least 1 and preferably not over 10, Y is oxygen or sulfur (and is preferably sulfur), $R_1$ and $R_2$ are alkyl, haloalkyl, aryl, haloryl, alkenyl, aralkyl, haloalkenyl or cycloalkyl and R is a divalent aromatic, aliphatic or cycloaliphatic group. Preferably $n$ is 1. The $R_1$ groups can be the same or different. Likewise the $R_2$ groups can be the same or different.

The compounds of the present invention are useful as antioxidants, e.g. for polyethylene, polypropylene, EPDM rubber, vinyl chloride resins, foods, lubricating oils, natural rubber, polybutadiene, butadiene-styrene copolymer, butadiene-acrylonitrile copolymer, acrylonitrile-butadiene-styrene terpolymer (ABS), poly cis-isoprene, polyesters, etc.

The compounds of the present invention are conveniently prepared by reacting an alcohol, phenol or mercaptan (including thiophenols) with a compound having the formula

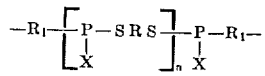

where $R_1$, R and $n$ are as defined above and X is chlorine or bromine. The compounds of formula II are disclosed and claimed in Rattenbury application 836,149, filed June 24, 1969 entitled "Polymercapto Chloride Polyphosphonite." The entire disclosure of the Rattenbury application is incorporated by reference. When $n$ is 1 in formula I, 2 moles of phenol or mercaptan of formula $R_2YH$ are reacted with 1 mole of the compound of formula II and the HCl formed is distilled off. When $n$ is 2 to 10, the following mole ratios should be used. Alcohol derivatives can be prepared when $n$ is 1 or a higher integer by transesterification of the corresponding phenoxy compound i.e., in formula I $R_2$ is phenyl

| n | phenol or mercaptan | Compound of Formula II |
|---|---|---|
| 2 | 3 | 1 |
| 3 | 4 | 1 |
| 4 | 5 | 1 |
| 5 | 6 | 1 |
| 6 | 7 | 1 |
| 7 | 8 | 1 |
| 8 | 9 | 1 |
| 9 | 10 | 1 |
| 10 | 11 | 1 |

If a mixture of $R_2YH$ compounds is used, then the product will have mixed $R_2$ groups.

Alternatively, the compounds of formula I can be formed by reacting in the correct molar proportions.

Thus when $n$ is 1, there is employed 2 moles of $R_1PCl_2$, 1 mole of HSRSH and 2 moles of $R_2YH$.

As examples of $R_2YH$ compounds (Y being oxygen or sulfur) there can be used methyl alcohol, ethyl alcohol, propyl alcohol, butyl alcohol, sec. butyl alcohol, t-butyl alcohol, isobutyl alcohol, amyl alcohol, hexyl alcohol, heptyl alcohol, octyl alcohol, isooctyl alcohol, 2-ethylhexyl alcohol, nonyl alcohol, decyl alcohol, isodecyl alcohol, dodecyl alcohol, hexadecyl alcohol, octadecyl alcohol, eicosanyl alcohol, chloroethyl alcohol, 3-chloropropyl alcohol, 2-chloropropyl alcohol, 4-chloro butyl alcohol, 6-chlorohexyl alcohol, 10-chlorodecyl alcohol, 18-chlorodecyl alcohol, 20chloroeicosanyl alcohol, allyl alcohol, α-naphthol, β-naphthol, crotyl alcohol, pentene-4-01, oleyl alcohol, 2-bromoethyl alcohol, 4-bromobutyl alcohol, phenol, o-cresol, m-cresol, p-cresol 4-butylphenol, 4octylphenol, 2-dodecylphenol, 4nonylphenol, 2,4,6-trimethylphenol, 2,6-xylenol, 2-chlorophenol, 4-chlorophenol, 3-bromophenol, 2,4-dichlorophenol, 2-chloro-4-methyl phenol, benzyl alcohol, cyclohexanol, cyclopentanol, alpha terpineol, methyl mercaptan, ethyl mercaptan, propyl mercaptan, butyl mercaptan, sec. butyl mercaptan, t-butyl mercaptan, isobutyl mercaptan, amyl mercaptan, hexyl mercaptan, heptyl mercaptan, octyl mercaptan, isootyl mercaptan, 2-ethylhexyl mercaptan, nonyl mercaptan, decyl mercaptan, isodecyl mercaptan, dodecyl mercaptan, t-dodecyl mercaptan, hexadecyl mercaptan (cetyl mercapten), octadecyl mercaptan, eicosanyl mercaptan, chloroethyl mercaptan, 3-chloropropyl mercaptan, 2-chloropropyl mercaptan, 4-chlorobutyl mercaptan, 6-chlorohexyl mercaptan, 10-chlorodecyl mercaptan, 18-chlorooctadecyl mercaptan, 20-chloroeicosanyl mercaptan, allyl mercaptan (propenethiol), α-naphthyl mercaptan, β-naphthyl mercaptan, crotyl mercaptan, pentene 4-thiol, oleyl mercaptan, 22-bromoethyl mercaptan, 4-bromobutyl mercaptan, thiophenol, 2-methyl benzenethiol, 3-methyl benzene thiol, 4-methyl benzene thio (p-thiocresol), 4-butybenzenethiol, 4octylbenzenethiol, 2-dodecylbenzenethiol, 4-nonyl-benzenethiol, 2,4,6-trimethylbenzenethiol, 2,6-dimethylbenzenethiol (thioxylenol), 2-chlorobenzenethiol, 4-chlorobenzenethiol, 3-bromobenzenethiol, 2,4-dichlorobenzenethiol, 2-chloro-4-methylbenzenethiol, benzyl mercaptan, cyclohexyl mercaptan, cyclopentyl mercaptan, mercapto-α-terpinene, mercapto phellandrene, mercapto sylvestrene, 2-mercaptopyridene, 5-mercaptopyridine, mercaptothiophene, 2-mercapto methylcyclohexane.

Examples of compounds having formula II which can be used to prepare the compounds of the present invention are 1,2-dimercaptoethylene bis(ethane phosphorus bromide), 1,2-dimercaptoethylene bis(haxanephosphorus chloride), 1,2-dimercaptoethylene bis (dodecane phosphorus chloride), 1,2-dimercapto propylene bis(butane phosphorus chloride), 1,3-dimercaptopropylene bis(isopropane phosphorus chloride), 1,6-dimercaptohexylene bis(methane phosphorus chloride), 1,6-dimercaptohexylene bis(ethane phosphorus chloride), 1,6-dimercaptohexylene bis(ethane phosphorus chloride), 1,6-dimercaptohexylene bis(ethane phosphorus bromide), 1,6-dimercaptohexylene bis(trimethylmethane phosphorus chloride), 1,6-dimercaptohexylene ethane phosphorus chloride propane phosphorus chloride, 1,6-dimercaptohexylene bis(1-methylpropane phosphorus chloride), 1,6-dimercaptohexylene dimercaptohexylene bis(hexane phosphorus chloride), 1,6- dimercaptohexylene bis(2-ethylhexane phosphorus chloride), 1,6-dimercaptohexylene bis(dodecane phosphorus chloride), 1,6-dimercaptohexylene bis(decane phosphorus chloride), 1,6-dimercaptohexylene nonane phosphorus chloride decane phosphorus chloride, 1,6-dimercaptohexylene bis(hexadecane phosphorus chloride), 1,6-dimercaptohexylene bis(isodecane phosphorus chloride), 1,6-dimercaptohexylene bis(octadecane phosphorus chloride), 1,6-dimercaptohexylene bis(eicosane phosphorus chloride), 1,6-dimercaptohexylene bis(phenyl methane phosphorus chloride), 1,6-dimercaptohexylene bis(cyclopentane phosphorus chloride), 1,6-dimercaptohexylene bis(cyclohexane phosphorus chloride), 1,6-dimercaptohexylene-bis(4-methyl cyclohexane phosphorus chloride), 1,6-dimercaptohexylene bis(2-chloroethane phosphorus chloride), 1,6-dimercaptohexylene 3-chloropropane phosphorus chloride), 1,6-dimercaptohexylene bis(α-terpinene phosphorus chloride), 1,6-dimercaptohexylene bis(4-bromobutane phosphorus chloride), 1,6-dimercaptohexylene bis(benzene phosphorus chloride), 1,6-dimercaptohexylene bis(benzene phosphorus bromide), 1,6-dimercaptohexylene decane phosphorus chloride benzene phosphorus chloride, 1,6-dimercaptohexylene bis(4-methylbenzene phosphorus chloride), 1,6-dimercaptohexylene bis(2,6-dimethylbenzene phosphorus chloride), 1,6-dimercaptohexylene bis(2,4,6-trimethylbenzene phosphorus chloride), 1,6-dimercaptohexylene bis(4-butylbenzene phosphorus chloride), 1,6-dimercaptohexylene bis(2-octylbenzene phosphorus chloride), 1,6-dimercaptohexylene bis(4-nonylbenzene phosphorus chloride), 1,6-dimercaptohexylene bis(3-dodecylbenzene phosphorus chloride), 1,6-dimercaptohexylene bis(2-bromobenzene phosphorus chloride), 1,6-dimercaptohexylene bis(4-chlorobenzene phosphorus chloride), 1,6-dimercaptohexylene bis(2-chloropropene phosphorus chloride), 1,4-dimercaptobutylene bis(dodecane phosphorus chloride), 1,6-dimercaptoeicosanylene bis(benzene phosphorus chloride), 1,20-dimercaptoeicosanylene bis(decane phosphorus chloride), β-β'-dimercapto ethyl ether bis(4-nonylbenzene phosphorus chloride), 3,3'-dimercaptopropyl thioether bis(dodecane phosphorus chloride), 1,4-dimercapto butene-2 bis(isodecane phosphorus chloride, 1,6-dimercaptohexylene bis(2-propene phosphorus chloride), 1,6-dimercaptohexylene bis(9-octadecene phosphorus chloride), 2,2'-dimercaptoethyl thioether bis (hexadecane phosphorus chloride), dimercaptodiethylene glycol bis(isodecane phosphorus chloride), dimercapto propylene glycol bis(benzene phosphorus chloride dimercapto tetraethylene glycol bis(4-nonyl benzene phosphorus chloride), omega, omega' dimercaptooctyl ether bis(dodecane phosphorus chloride), omega, omega' dimercaptooctyl thioether bis(dodecane phosphorus chloride, 2,9-dimercapto-p-menthylene bis(dodecane phosphorus chloride), 2,9-dimercapto-p-menthylene bis(benzene phosphorus chloride), 2,9-dimercapto-p-menthylene bis(napththalene phosphorus chloride), 2,5-dimercaptopyridine bis(dodecane phosphorus chloride), 2,5-dimercaptothiophene bis(octane phosphorus chloride), -p-dimercaptophenylene bis(dodecane phosphorus chloride), -p-dimercaptophenylene bis(o-octylbenzene phosphorus chloride), 2-methyl-1,4-dimercaptohexylene bis(dodecane phosphorus chloride), 1,4-dimercaptocyclohexylene (hexadecane phosphorus chloride), isopropylidene bis(4-mercaptobenzene) bis(dodecane phosphorus chloride), isopropylidene bis(4,-mercaptobenzene bis(benzene phosphorus chloride), 1,4-bis(mercaptomethyl benzene bis(dodecane phosphorus chloride), 1,4-bis(mercaptomethyl cyclohexane bis(benzene phosphorus chloride), 1,3-dimercaptocyclopentylene bis(dodecane phosphorus chloride), 1,8-dimercaptonaphthalene bis(benzene phosphorus chloride), bis(1,6-hexylenedimercapto) tris(dodecane phosphorus chloride), bis(1,6-hexylenedimercapto) tris(benzene phosphorus chloride), bis(1,6-hexylenedimercapto tris(benzene phosphorus bromide), bis(1,2-ethylenedimercapto tris(octadecane phosphorus chloride), bis(2,9-p-menthylene dimercapto) tris(dodecane phosphorus chloride), bis(β,β'-dimercaptoethyl ether) tris(decane phosphorus chloride), tris1,6-hexylenedimercapto) tetrakis (dodecane phosphorus chloride), tetrakis(1,6-hexylene dimercapto) pentakis(benzene phosphorus chloride), nonakis(1,6-hexylenedimercapto decakis(benzene phosphorus chloride), nonakis (2,9-p-menthylene dimercapto) decakis(dodecane phosphorus chloride), 1,4dimercaptobutylene bis(butane phosphorus chloride), 1,8-dimercaptooctylene bis(butane phosphorus chloride).

Examples of compounds within the present invention are bis(mercaptolauryl) 1,2-dimercaptoethylene bis(ethane phosphonite), di(p-nonylphenoxy) 1,2-dimercaptoethylene bis(ethane phosphonite), bis(decoxy) 1,2-dimercaptoethylene bis(hexane phosphonite), bis(mercaptodecyl) 1,2-dimercaptoethylene bis(hexane phosphonite), bis(mercaptooctyl 1,2-dimercaptoethylene bis(dodecane phosphonite), bis(mercaptophenyl) 1,2-dimercaptopropylene bis(butane phosphonite), bis(octadecoxy) 1,3-dimercaptopropylene bis(isopropane phosphonite), diphenoxy 1,6-dimercaptohexylene bis(benzene phosphonite), bis(mercaptolauryl) 1,6-dimercaptohexylene bis(benzene phosphonite), bis(octadecoxy) 1,6-dimercaptohexylene bis(methane phosphonite, bis(mercaptooctadecyl) 1,6-dimercaptohexylene bis(ethane phosphonite), bis(1-mercapto-2-propene) 1,6-dimercaptohexylene bis(trimethylmethane phosphonite), bis(mercaptophenyl) 1,6-dimercaptohexylene bis(1-methylpropane phosphonite), bis(mercaptooctadecenyl) 1,6-dimercaptohexylene bis(hexane phosphonite), bis(2-chloroethoxy) 1,6-dimercaptohexylene bis(octane phosphonite), bis(mercaptobenzyl) 1,6-dimercaptohexylene bis(dodecane phosphonite), bis(mercaptocyclohexyl) 1,6-dimercaptohexylene bis(decane phosphonite), bis(2-chloro-1-mercaptoethyl) 1,6-dimercaptohexylene bis(hexadecane phosphonite), bis(1-mercaptonaphthyl) 1,6-dimercaptohexylene bis(octadecane phosphonite), bis(thiophenyl) 1,6-dimercaptohexylene bis(eicosane phosphonite), bis(4-methyl mercaptophenyl) 1,6-dimercaptohexylene bis (phenylmethane phosphonite), bis(2,6-dimethyl thiophenyl) 1,6-dimercaptohexylene bis(cyclopentane phosphonite), bis (mercaptocyclohexyl) 1,6-dimercaptohexylene bis(cyclohexane phosphonite), bis(cyclohexoxy) 1,6-dimercaptohexylene bis(4- methylcyclohexane phosphonite), bis(dodecoxy) 1,6-dimercaptohexylene bis(2-chloroethane phosphonite), bis (mercaptomethyl) 1,6-dimercaptohexylene bis(3-chloropropane phosphonite), bis mercaptoeicosanyl) 1,6-dimercaptohexylene bis($\alpha$-terpinene phosphonite), bis(p-cresoxy) 1,6-dimercaptohexylene bis(4-bromobutane phosphonite), bis(2-bromoethoxy) 1,6-dimercaptohexylene bis(benzene phosphonite), bis(isodecoxy 1,6-dimercaptohexylene bis(benzene phosphonite), bis(mercaptophenyl) 1,6-dimercaptohexylene bis(benzene phosphonite), diphenoxy 1,6-dimercaptohexylene bis(4-methylbenzene phosphonite), bis(thiodecyl) 1,6-dimercaptohexylene bis(2,6-dimethylbenzene phosphonite), bis(methoxy) 1,6-dimercaptohexylene bis(2,4,6-trimethylbenzene phosphonite), bis(thiohexyl) 1,6-dimercaptohexylene bis(4-butylbenzene phosphonite), thiolauryl thiohexadecyl 1,6-dimercaptohexylene bis(2-octylbenzene phosphonite), bis(2-dodecyl thiophenyl) 1,6-dimercaptohexylene bis(4 -nonylbenzene phosphonite), diphenoxy 1,6-dimercaptohexylene bis(3-dodecylbenzene phosphonite), bis(thiolauryl) 1,6-dimercaptohexylene bis(2-bromobenzene phosphonite), bis (thiophenyl) 1,6-dimercaptohexylene bis(4-chlorobenzene phosphonite), bis(nonylphenoxy) 1,6-dimercaptohexylene bis(2-chloropropene phosphonite), bis(thiolauryl) 1,4-dimercaptobutylene bis(dodecane phosphonite), diphenoxy 1,20-dimercaptoeicosanylene bis(decane phosphonite), bis (mercaptolauryl) $\beta,\beta'$-dimercapto ethyl ether bis(4-nonylbenzene phosphonite), bis(mercaptophenyl) 3,3'-dimercapto propyl thioether bis(dodecane phosphonite), bis(mercaptolauryl 1,4-dimercapto butene-2 bis(decane phosphonite), diphenoxy 1,6-dimercaptohexylene bis(2-propene phosphonite), bis (mercaptolauryl) 1,6-dimercaptohexylene bis(9-octadecene phosphonite), bis(thiophenyl) 2,2'-dimercaptoethyl thioether bis(hexadecane phosphonite), bis(dodecoxy) dimercapto diethylene glycol bis(decane phosphonite), bis(p-nonylthiophenyl) dimercapto propylene glycol bis(benzene phosphonite), bis (p-nonylphenoxy) dimercapto tetraethylene glycol bis (4-nonylbenzene phosphonite), bis(mercaptolauryl) omega, omega' dimercaptooctyl ether bis(dodecane phosphonite), bis(mercaptodecyl) 2,9-dimercapto-p-menthylene bis(dodecane phosphonite), diphenoxy-p-menthylene bis(benzene phosphonite), bis(mercaptolauryl) 2,9-dimercapto-p-menthylene bis (naphthalene phosphonite), bis(mercaptolauryl) 2,5-dimercaptopyridine bis(dodecane phosphonite), bis(p-nonylphenoxy) p-dimercaptophenylene bis(dodecane phosphonite), bis(mercaptooctyl) p-dimercaptophenylene bis(o-octylbenzene phosphonite), bis(mercaptolauryl) 2-methyl-1,4-dimercaptophenylene bis(dodecane phosphonite), diphenoxy 1,4-dimercaptocyclohexylene bis(hexadecane phosphonite), bis(mercaptolauryl) isopropylidene bis(4-mercaptobenzene) bis(dodecane phosphonite), bis(decoxy) isopropylidene bis(4-mercaptobenzene bis(benzene phosphonite), bis(mercaptolauryl) 1,4-bis(mercaptomethyl) benzene bis(dodecane phosphonite), bis(mercaptophenyl) 1, 1,4-bis(mercaptomethyl) cyclohexane bis (benzene phosphonite), tris(mercaptolauryl) bis(1,6-hexylene dimercapto) tris(dodecane phosphonite), tris(phenoxy) bis (1,6-hexylenedimercapto) tris(benzene phosphonite), tris (mercaptophenyl) bis(1,2-ethylenedimercapto) tris(octadecane phosphonite), tris(mercaptolauryl) bis(2,9-p-methylene dimercapto) tris(dodecane phosphonite), tris(phenoxy) bis ($\beta,\beta'$-dimercaptoethyl ether) tris(decane phosphonite), tetrakis(mercaptolauryl) tris(1,6-hexylene dimercapto) tetrakis(dodecane phosphonite), pentakis(phenoxy) tetrakis (1,6-hexylene dimercapto) pentakis(benzene phosphonite), decakis(thiolauryl) nonakis(1,6-hexylene dimercapto) decakis(benzene phosphonite), bis(thiobutyl) 1,4-dimercaptobutylene bis(butane phosphonite), bis(thiobutyl) 1,8-dimercaptooctylene bis(butane phosphonite).

Unless otherwise indicated all parts and percentages are by weight.

The compounds of the present invention are useful as antioxidants and stabilizers for halogen containing resins, preferably vinyl chloride resins.

As the halogen containing resins there can be used resins made from vinylidene compounds such as vinyl chloride, vinylidene chloride, vinyl chloroacetate, chlorostyrenes, vinyl bromide and chlorobutadienes.

Such vinylidene compounds may be polymerized alone or in admixture with each other or with vinylidene compounds free from halogen. Among the halogen free materials which can be copolymerized with the halogen containing vinylidene compounds, e.g. vinyl chloride, are vinyl esters of carboxylic acids, e.g. vinyl acetate, vinyl propionate, vinyl butyrate and vinyl benzoate, esters of unsaturated acids, e.g., alkyl and alkenyl acrylates such as methyl acrylate, ethyl acrylate, propyl acylate, butyl acrylate and allyl acrylate as well as the corresponding methacrylates, e.g. methyl methacrylate and butyl methacrylate, vinyl aromatic compounds, e.g. styrene, p-ethyl styrene, divinyl benzene, vinyl naphthalene, $\alpha$-methyl styrene, p-methyl styrene, dienes such as butadiene and isoprene, unsaturated amides such as acrylamide, methacrylamide and acrylanilide and the esters of $\alpha,\beta$-unsaturated carboxylic acids, e.g. The methyl, ethyl, propyl, butyl, amyl, hexyl, heptyl, octyl, allyl, methallyl and phenyl esters of maleic, crotonic, itaconic and fumaric acids and the like. Specific examples of such esters are diethyl maleate, dibutyl maleate and dibutyl fumarate.

The copolymers in which at least 50 percent of the copolymer is made from a halogen containing vinylidene compound such as vinyl chloride are preferably treated according to the invention.

The stabilizers of the present invention are also effective when intimately mixed with halogen containing resins in which part or all of the halogen is introduced into a performed resin, e.g. chlorinated polyvinyl acetate, chlorinated polystyrene, chlorinated polyethylene, chlorinated polyvinyl chloride, chlorinated natural and synthetic rubbers and rubber hydrochloride.

Typical examples of copolymers include vinyl chloride-vinyl acetate (95:5 weight ratio), vinyl chloride-vinyl acetate (87:13 weight ratio), vinyl chloride-vinyl acetate-maleic anhydride (86:13:1 weight ratio), vinyl chloride-vinylidene chloride (95:5 weight ratio), vinyl chloride-diethyl fumarate (95:5 weight ratio), vinyl chloride-trichloroethylene (95:5 weight ratio).

The resin, e.g. polyvinyl chloride, can either be plasticized or unplasticized. As the plasticizer there can be employed conventional materials such as dioctyl phthalate, octyl decyl phthalate, tricresyl phosphate, 2-ethylhexyl diphenyl phosphate, dodecyl dicresyl phosphate, tributyl acetyl citrate, dioctyl sebacate, dibutyl sebacate, etc. The plasticizer is used in conventional amount, e.g. 10 to 100 parts for each 100 parts of the vinyl chloride containing resin.

The mercapto containing stabilizers of the present invention are used in an amount of 0.05 to 20 parts, preferably 0.1 to 10 parts per 100 parts of halogen containing resin.

There can also be incorporated 0.1 to 10 parts per 100 parts of the halogen containing resins of a metal salt stabilizer. Thus, there can be used barium, strontium, calcium, cadmium, zinc, lead, tin, magnesium, cobalt, nickel, titanium and aluminum salts of phenols, aromatic carboxylic acids, fatty acids and epoxy fatty acids.

Examples of suitable salts include barium di(nonylphenolate), strontium di(nonylphenolate), strontium di(amylphenolate), barium di(octylphenolate), strontium di(octylphenolate), barium di(nonyl-o-cresolate), lead di(octylphenolate), cadmium-2-ethylhexoate, cadmium laurate, cadmium stearate, zinc caprylate, cadmium caproate, barium stearate, barium 2-ethyl-hexoate, barium laurate, barium ricinoleate, lead stearate, aluminum stearate, magnesium stearate, calcium octoate, calcium stearate, cadmium naphthenate, cadmium benzoate, cadmium p-tert, butylbenzoate, barium octyl salicylate, cadmium epoxy stearate, strontium epoxy stearate, cadmium salt of epoxidized acids of soybean oil, and lead epoxy stearate.

In plastisol formulations, there is preferably also included from 0.1 to 10 parts per 100 parts of resin of an epoxy vegetable oil such as epoxidized soybean oil or epoxidized tall oil.

Also there can be incorporated a phosphite, e.g. an alkyl, aryl or aralkyl phosphite in an amount of 0.1 to 10 parts per 100 parts of resin. Typical of such phosphites are triphenyl phosphite, tris decyl phosphite, decyl diphenyl phosphite, di(p-tert. butylphenyl) phenyl phosphite, di-phenyl o-cresyl phosphite, trioctyl phosphite, tricresyl phosphite and tribenzyl phosphite.

The compounds of the present invention are also stabilizers for monoolefin polymers such as polyethylene, polypropylene, ethylene propylene copolymers (e.g. 50:50 80:20 and 20:80), ethylene-monoolefin copolymers wherein the monoolefin has four to 10 carbon atoms and is present in a minor amount, e.g. ethylene-butene-1 copolymer (95:5) and ethylene-decene-1 copolymer (90:10). Furthermore, they can be used to stabilize natural rubber, styrene-butadiene rubber (SBR rubber), e.g. (75 percent butadiene, 25 percent styrene) and EPDM rubbers and acrylonitrile-butadiene styrene terpolymers (ABS).

As the EPDM rubber there can be employed many of the commercially available EPDM rubbers. The EPDM rubber normally contains 30 to 70 molar percent (preferably 50 to 60 molar percent) of ethylene, 65 to 20 molar percent (preferably 35 to 45 molar percent propylene) and 1 to 15 molar percent (preferably 3 to 5 molar percent) of the nonconjugated polyolefin. Usually the polyolefin is not over 10 molar percent. The ethylene and propylene can each be 5 to 95 molar percent of the composition.

As used in the present specification and claims the term nonconjugated polyolefin includes aliphatic unconjugated polyene hydrocarbons and cycloaliphatic nonconjugated polyene hydrocarbons, e.g., endocyclic dienes. Specific examples of suitable nonconjugated polyolefins include pentadiene-1,4; hexadiene-1,4; dicyclopentadiene, methyl cyclopentadiene dimer, cyclododecatriene, cyclooctadiene-1,5; 5-methylene-b 2-norbornene.

Specific examples of suitable terpolymers are the Royalenes which contain 55 mole percent ethylene, 40 to 42 mole percent propylene and 3 to 5 mole percent dicyclopentadiene; Enjay terpolymers, e.g., ERP-404 of Enjay and Enjay 3509 which contains about 55 mole percent ethylene, 41 mole percent propylene and 4 mole percent 5-methylene-2-norborene; Nordel, a terpolymer of 55 mole percent ethylene, 40 mole percent propylene and 5 mole percent hexadiene-1,4. Another suitable terpolymer is the one containing 50 mole percent ethylene, 47 mole percent propylene and 3 mole percent 1,5-cyclooctadiene (Dutrel).

Examples of EPDM rubbers are given in U.S. Pat. Nos. 2,933,480; 3,000,866; 3,063,973; 3,093,620; 3,093,621, and 3,136,739, in British Patent 880,904 and in Belgian Patent 623,698.

Terpolymers and other EPDM rubbers from ethylene, propylene and dicyclopentadiene are exemplified in Tarney U.S. Pat. No. 3,000,866; Adamek U.S. Pat. No. 3,136,739 and Dunlop (British) U.S. Pat. No. 880,904. EPDM rubbers from ethylene, propylene and 1,4-hexadiene are exemplified in Gresham U.S. Pat. No. 2,933,480. As shown in Gresham other suitable nonconjugated diolefins are 1,4-pentadiene; 2-methyl-1,5 hexadiene, 3,3-dimethyl-1, 5-hexadiene, 1,7-octadiene, 1,9-decadiene, 1,19-eicosadiene, 1,4-hexadiene, 1,9octadecadiene, 6-methyl-1,5-heptadiene, 7-methyl-1,6-octadiene, 11-ethyl-1,11-tridecadiene.

EPDM rubbers from ethylene, propylene and 5-methylene -2-norbornene are exemplified in U.S. Pat. No. 3,093,621. Suitable norbornadiene, e.g., 2-methyl norbornadiene, 2-ethyl norbornadiene, 2-n-neptyl norbornadiene are shown in Gladding U.S. Pat. No. 3,063,973 and bicyclo compounds such as bicyclo (2,2,2) heptadiene-2,5 are shown in Dunlop (British) Patent 880,904. The use of cyclodienes 1,5 and other cyclodienes is shown in Montecatini (Belgium) Patent 623,698. Thus these can be used in making the EPDM elastomer 1,4-cycloheptadiene, 1,4-cyclooctadiene, 1,6-cyclodecadine, 1,5-cyclododecadiene, 1,7-cyclodecadiene, 1, 1,5,9-cyclododecatriene, 1-methyl-1,5-cyclooctadiene.

The compounds of the present invention are normally employed in an amount of at least 0.01 percent and usually 0.1 percent to 10 percent by weight of the polymer they are intended to stabilize.

They can also be used as synergistic stabilizers with other sulfur containing compounds. Thus, there can be employed therewith neutral sulfur compounds having a thio linkage beta to a carbon atom having both a hydrogen atom and a carboxyl group attached thereto. Such compounds are used in an amount of 0.01 to 10 percent, preferably 0.1 to 5 percent. Thus there can be used pentaerythritol tetra (mercaptoacetate), 1,1,1-trimethylolethane tri(mercaptoacetate), 1,1,1-trimethylolpropane tri(mercaptoacetate), dioleyl thiodipropionate, dilauryl thiodipropionate, other thio compounds include distearyl 3,3'-thiodipropionate, dicyclohexyl-3,3'-thiodipropionate, dicetyl-3,3'-thiodipropionate, dioctyl-3,3'-thiodipropionate dibenzyl-3,3'-thiodipropionate, lauryl myristyl-3,3'-thiodipropionate, diphenyl-3,3'-thiodipropionate, di-p-methoxyphenyl-3,3'-thiodipropionate, didecyl-3,3'-thiodipropionate, dibenzyl-3,3'-thiodipropionate, diethyl-3,3'-thiodipropionate, lauryl ester of 3-methylmercapto propionic acid, lauryl ester of 3-butyl-mercapto propionic acid, lauryl ester of 3-laurylmercapto propionic acid, phenyl ester of 3-octylmercapto propionic acid, lauryl ester of 3-phenylmercapto propionic acid, lauryl ester of 3-benzylmercapto propionic acid, lauryl ester of 3-(p-methoxy) phenylmercapto propionic acid, lauryl ester of 3cyclohexylmercapto propionic acid, lauryl ester of 3-hydroxymethylmercaptopropionic acid, myristyl ester of 3-hydroxyethylmercapto propionic acid, octyl ester of 3-methoxymethylmercapto propionic acid, dilauryl ester of 3-hydroxymethylmercaptopropionic acid, myristyl ester of 3-hydroxyethylmercapto propionic acid, octyl ester of 3-methoxymethylmercapto propionic acid, dilauryl ester of 3-carboxymethylmercapto propionic acid, dilauryl ester of 3-carboxypropylmercapto propionic acid, dilauryl-4,7-dithiasebacate, dilauryl-4,7,8,11-tetrathiotetradecandioate, dimyristyl-4,11-dithiatetradecandioate lauryl-3-benzothiazylmercaptopropionate. Preferably the esterify alcohol is an alkanol having 10 to 18 carbon atoms. Other esters of beta thiocarboxylic acids set forth in Gribbins U.S. Pat. No. 2,519,744 can also be used.

Other beta thiocarboxylic acids include stearyl (1,2-dicarboethoxyethylthio) acetate, stearyl (1,2-dicarbolauryloxyethyltio) acetate or the like. Compounds of this type can be made by addition of alkyl ester of mercaptoacetic acid to a dialkyl ester of maleic acid. Similar beta thiocarboxyl compounds can be used which are made by addition of an RSH compound across the maleic ester double bond and where R is alkyl, aryl, alkylcarboxyalkyl, arylcarboxyalkyl or aralkyl. Examples of such compounds are decylthiodilauryl maleate, phenylthiodioctyl maleate, cetyl (1,2-dicarboethoxyethylthio) propionate and benzylthiodimyristyl maleate.

Similarly useful beta thiocarboxyl synergistic compounds can be prepared by addition of the RSH compounds as defined above across the double bond of dialkyl itaconates, citraconates, fumarates or trialkyl aconitates, e.g. the addition product of lauryl mercaptan with dibutyl itaconate, the addition product of the stearyl ester of mercaptoacetic acid with dilauryl itaconate, the addition product of butyl mercaptan with dilauryl citraconate, the addition product of lauryl mercaptan with tributyl aconitate, the addition product of the lauryl ester of mercaptopropionic acid with triethyl aconitate.

The thermal stability of the polypropylene and other monoolefin polymer is adversely affected by impurities including residual catalyst. When thermal stability is important in addition to oxidative stability it has been found valuable to include polyvalent metal salts of fatty acids in an amount of 0.01 to 10 percent, preferably 0.1 to 5 percent, in the monoolefin polymer formulations. Examples of such salts are calcium stearate, calcium 2-ethylhexoate, calcium octate, calcium oleate, calcium ricinoleate, calcium myristate, calcium palmitate, calcium laurate, barium laurate, barium stearate, magnesium stearate as well as zinc stearate, cadmium laurate, cadmium octoate, cadmium stearate and the other polyvalent metal salts of fatty acids set forth previously.

There can also be added phenolic antioxidants in an amount of 0.1 to 10 percent, preferably 0.1 to 5 percent. Examples of such phenols include 2,6-di-t-butyl-p-cresol, butylated hydroxyanisole, propyl gallate, 4,4'-thiobis(6-t-butyl-m-cresol), 4,4'-cyclohexylidene diphenol, 2,5-di-t-amyl hydroquinone, 4,4'-butylidene bis(6-t-butyl-m-cresol), hydroquinone monobenzyl ether, 2,2'-methylene-bis(4-methyl-6-t-butylphenol), 2,6-butyl-4-decyloxyphenol, 2-t-butyl-4-doecyloxyphenol, 2-t-butyl-4-dodecyloxyphenyl, 2-t-butyl-4-octadecyloxyphenol, 4,4'-methylene-bis(2,6-di-t-butyl phenol), p-aminophenol, N-lauryloxy-p-aminophenol, 4,4'-thiobis(3-methyl-6-t-butylphenol), bis[o-(1,1,3,3-tetramethylbutyl)phenol] sulfide, 4-acetyl -β-resorcylic acid, A stage p-t-butylphenolformaldehyde resin, 4-dodecyloxy-2-hydroxybenzophenone, 3-hydroxy-4-(phenylcarbonyl)phenyl palmitate, n-dodecyl ester of 3-hydroxy -4-(phenylcarbonyl) phenoxyacetic acid, and t-butylphenol.

The use of epoxy compounds in an amount of 0.01 to 5 percent in the polymer compositions is also valuable. Examples of such epoxy compounds include epoxidized soya bean oil, epoxidized lard oil, epoxidized olive oil, epoxidized linseed oil, epoxidized caster oil, epoxidized peanut oil, epoxidized corn oil, epoxidized tung oil, epoxidized cottonseed oil, epichlorhydrin-bisphenol A resins (epichlorhydrin-diphenylolpropane resins), phenoxy-propylene oxide, butoxy-propylene oxide, epoxidized neopentylene oleate, glycidyl epoxystearate, epoxidized α-olefins, epoxidized glycidyl soyate, dicyclopentadiene dioxide, epoxidized butyl tollate, styrene oxide, dipentene dioxide, glycidol, vinyl cyclohexene dioxide, glycidyl ether of resorcinol, glycidol ether of hydroquinone, glycidyl ether of 1,5-dihydroxynaphthalene, epoxidized linseed oil fatty acids, allyl glycidyl ether, butyl glycidyl ether, cyclohexane oxide, 4-(2,3-epoxypropoxy) acetophenone, mesityl oxide epoxide, 2-ethyl -3-propyl glycidamide, glycidyl ethers of glycerine, pentaerythritol and sorbitol, and 3,4-epoxycyclohexane-1,1-dimethanol bis-9,10-epoxystearate.

The compounds of the present invention can also be employed in conjunction with other phosphorus compounds, particularly phosphites and thiophosphites as antioxidants and stabilizers. The phosphite or thiophosphite is employed in an amount of 0.01 to 10 percent of the polymer (or other material) being stabilized. Thus there can be employed tristearyl phosphite, trilauryl trithiophosphite, trilauryl phosphite or any of the phosphites or thiophosphites in Friedman U.S. Pat. No. 3,039,993, Friedman U.S. Pat. No. 3,047,608, Friedman U.S. Pat. No. 3,053,878 or Larrison U.S. Pat. No. 3,341,629.

In the following examples, example 1 is directed to a method of making the starting material and the remaining examples are directed to the preparation and use of the compounds of the invention.

EXAMPLE 1

1,6-Dimercaptohexylene bis(benzene phosphorus chloride)

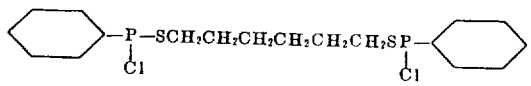

150 grams (1 mole) of 1,6-hexanedithiol were changed to a 1,000 ml. flask and 358 grams (2 moles) of benzene phosphorus dichloride were added from a dropping funnel. 50 minutes were required for the addition. The temperature ranged between 75°–90° C. The temperature was then slowly increased to 120° C. and then HCl removed through a water aspirator.

EXAMPLE 2

Diphenoxy 1,6-dimercaptohexylene bis(benzene phosphonite)

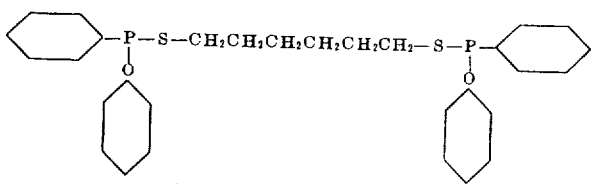

104 grams of phenol were charged to a 500 ml. flask and heated to 95° C. 211 grams of the 1,6-dimercaptohexylene bis(benzene phosphorus chloride) prepared in Example 1 were added from a pressure equalizing dropping funnel during a 20 minute interval. The reaction mixture was slowly heated to liberate HCl until gas evolution substantially stopped. Residual HCl was removed through a water aspirator to a temperature of 140° C. The pressure was then reduced and HCl removed to a terminal temperature of 215° C. and 2 Torr. The product (residue in the flask) was stirred with a small amount of soda ash and filter aid and then filtered to give a liquid,

| | |
|---|---|
| R.I.$_{n_D}^{25}$ | 1.6280 |
| Specific gravity 25°C/25°C | 1.185 |
| Acid No. (mg. KOH per gram) | 5.1 |
| Color, APHA | 100 |
| % P | 11.1 |
| % Cl | Trace |

EXAMPLE 3

Bis(mercaptolauryl) 1,6-dimercaptohexylene bis (benzene phosphonite)

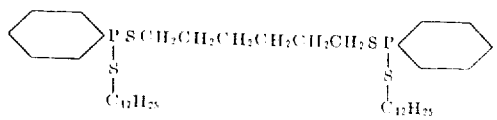

211 grams of the product of Example 1 were placed in a 1,000 ml. flask and 224 grams of n-dodecyl mercaptan were added from a dropping funnel. The reaction mixture was then heated to 140° C. at atmospheric pressure. The pressure was then reduced as in example 2 and the HCl and distillate removed. The liquid product (flask residue) was stirred with dry soda ash, filter aid and then filtered at 130° C.

The properties of the product (filtrate) were

| | |
|---|---|
| R.I.$_{n_D}^{25}$ | 1.5540 |
| Specific Gravity 25°C/25°C | 1.065 |
| Acid No., (mg. KOH per gram) | 1.33 |
| Color, APHA | 0 |
| % P | 8.0 |

EXAMPLE 4

The procedure of Example 2 was repeated using 1 mole of 1,6-dimercaptohexylene bis(decane phosphorus chloride) and 2.1 moles of n-dodecyl mercaptan to produce bis(mercaptolauryl 1,6-dimercaptohexylene bis (decane phosphonite).

EXAMPLE 5

The procedure of Example 2 was repeated using 1 mole of 1,2-dimercaptoethylene bis(benzene phosphorus chloride) and 2.1 moles of n-dodecylmercaptan to produce bis(mercaptolauryl) 1,2-dimercaptoethylene bis(benzene phosphonite).

EXAMPLE

Bis(decoxy) 1,6 dimercaptohexylene bis (benzenephosphonite) was prepared by reacting 2.1 moles of decyl alcohol with the product of Example 2 and removing the phenol formed.

EXAMPLE 7

The procedure of Example 2 was repeated using 1 mole of 2,9-dimercapto-p-menthylene bis(benzene phosphorus chloride and 2.1 mole of n-dodecyl mercaptan to produce bis(mercapto lauryl) 2,9-dimercapto-p-menthylene bis(benzene phosphonite).

EXAMPLE 8

The procedure of Example 7 was repeated using 2.1 mole of phenol in place of the dodecyl mercaptan to produce diphenoxy 2,9-dimercapto-p-menthylene bis(benzene phosphonite).

EXAMPLE 9

The procedure of Example 2 was repeated using 1 mole of β,β'-dimercapto ethyl ether bis(benzene phosphorus chloride) and 2.1 moles of n-dodecyl mercaptan to produce bis(mercaptolauryl)β,β'-dimercapto ethyl ether bis(benzene phosphonite.

EXAMPLE 10

The procedure of Example 9 was repeated replacing the dodecyl mercaptan by 2.1 moles of phenol to produce diphenoxy β,β'-dimercaptoethyl ether bis(benzene phosphonite).

EXAMPLE 11

The procedure of Example 2 was repeated using 1 mole of bis(1,6-hexylenedimercapto) tris(benzene phosphorus chloride) and 3.1 moles of n-dodecyl mercaptan to produce tris(mercaptolauryl) bis(1,6-hexylenedimercapto tris (benzenephosphonite).

EXAMPLE 12

The procedure of Example 11 was repeated replacing the dodecyl mercaptan by 3.1 moles of phenol to produce tris (phenoxy) bis(1,6-hexylenedimercapto) tris(benzene phosphonite).

EXAMPLE 13

1 part of the product of Example 2 was mixed with 100 parts of rigid polyvinyl chloride.

EXAMPLE 14

1 part of the product of Example 3 was mixed with 100 parts of vinyl chloride resin also containing 60 parts of divinyl phthalate and 1 part of barium-cadmium laurate.

EXAMPLE 15

1 part of the product of Example 4 was mixed with 100 parts of natural rubber to stabilize the rubber.

EXAMPLE 16

1 part of the product of Example 3 was mixed with 100 parts of polypropylene to stabilize the polymer.

EXAMPLE 17

1 part of the product OF Example 2 was mixed with 100 parts of EPDM rubber (55 mole percent ethylene, 41 mole percent propylene, 4 mole percent dicyclopentadiene) to stabilize the rubber.

EXAMPLE 18

100 parts of polypropylene (melt index 0.4) was mixed with a stabilizer consisting of 0.2 parts of the product of Example 2, 0.2 parts of dilaurylthiodipropionate and 0.2 parts of calcium stearate to give a polypropylene of improved heat stability, e.g. at 133° C.

EXAMPLE 19

100 parts of polypropylene (melt index 0.4) was mixed with a stabilizer consisting of 0.25 parts of the product of Example 3 and 0.25 parts of dilauryl thiodipropionate to give a polypropylene of improved stability.

EXAMPLE 20

100 parts of polypropylene (melt index 0.4) was mixed with a stabilizer consisting of 0.2 parts of the product of Example 2, 0.2 parts of dilaurylthiodipropionate and 0.2 parts of 2,2'-methylene bis(4-methyl-6-t-butylphenol).

What is claimed is:

1. A compound having the formula

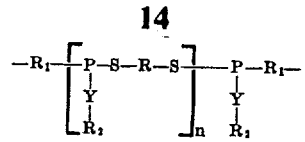

where $n$ is an integer of 1 to 10, Y is oxygen or sulfur, $R_1$ is alkyl of one to 20 carbons, chloro or bromoalkyl having two to four carbon atoms in the alkyl group, phenyl, alkylphenyl having one to 12 carbon atoms in the alkyl groups, naphthyl, chlorophenyl, bromophenyl, alkenyl having three to 18 carbon atoms in the alkenyl group, chloropropenyl, benzyl, or cycloalkyl having five to six carbon atoms in the cycloalkyl ring, $R_2$ is alkyl of one to 20 carbon atoms, chloro or bromoalkyl having two to 20 carbon atoms in the alkyl group, phenyl, alkylphenyl having one to 12 carbon atoms in the alkyl groups, methyl chlorophenyl, naphthyl, chlorophenyl, bromophenyl, alkenyl having three to 18 carbon atoms in the alkenyl group, benzyl, cycloalkyl having five to six carbon atoms in the cycloalkyl ring or terpinyl and R is divalent alkylene having two to 20 carbon atoms, six butene, alkyleneoxyalkylene where each alkylene group has two to 8 carbon atoms, ethylene polyoxyethylene having 2 to 4 oxygen atoms, alkylenethioalkylene where each alkylene group has two to eight carbon atoms, phenylene, naphthylene, divalent pyridine, divalent thiophene, cycloalkylene having five to six carbon atoms in the cycloalkylene group, isopropylidene bisphenylene, benzene bismethylene, cyclohexane bismethylene.

2. A compound according to claim 1 wherein R is hydrocarbon, oxahydrocarbon or thiohydrocarbon.

3. A compound according to claim 2 where Y is oxygen.

4. A compound according to claim 2 where Y is sulfur.

5. A compound according to claim 2 wherein $R_1$ and $R_2$ are alkyl of one to 20 carbon atoms, phenyl, alkylphenyl having up to 12 carbon atoms in the alkyl group, halophenyl where the halogen has an atomic weight of 35 to 80, alkenyl of three to 18 carbon atoms, benzyl or cycloalkyl having five to six carbon atoms in the ring.

6. A compound according to claim 5 wherein R is alkylene of at least two carbon atoms, cycloalkylene, phenylene or naphthylene.

7. A compound according to claim 6 wherein R is menthylene.

8. A compound according to claim 6 wherein $n$ is 1.

9. A compound according to claim 8 wherein R is alkylene.

* * * * *